Oct. 21, 1958    D. E. MEDLOCK    2,857,005
FIRE FIGHTING APPARATUS
Filed July 19, 1957    2 Sheets-Sheet 1

INVENTOR.
Donald E. Medlock
BY

Oct. 21, 1958  D. E. MEDLOCK  2,857,005
FIRE FIGHTING APPARATUS
Filed July 19, 1957  2 Sheets-Sheet 2

INVENTOR.
Donald E. Medlock
BY 2,857,005
Patented Oct. 21, 1958

United States Patent Office

2,857,005

FIRE FIGHTING APPARATUS

Donald E. Medlock, Wichita, Kans., assignor to Boeing Airplane Company, Wichita, Kans., a corporation of Delaware Application July 19, 1957, Serial No. 672,931

8 Claims. (Cl. 169—2)

My invention relates to fire fighting apparatus and, more specifically, to a device for applying a fire extinguishing fluid to the interior of an aircraft on the ground. Briefly, the equipment includes a self-propelled vehicle supporting on a boom a nozzle to be rammed into an exterior wall of the aircraft. The nozzle has a penetrating auger and the fire extinguishing fluid passes from a source on the vehicle through ports in the auger into the aircraft. The nozzle is detachably supported on the boom and has attached thereto an extendible hose, whereby the vehicle may be backed away after auger penetration to a location avoiding destructive heat.

Aircraft fires occurring on the ground are difficult to fight because inflammable materials such as fuel may blaze beyond control if the blaze is not promptly extinguished. Aircraft compartments are sealed and are difficult to gain rapid access to when a fire occurs. It is an object of my invention to provide means to apply fire extinguishing fluid to the interior of the aircraft at a selected point in the least possible time.

One difficulty in fighting an aircraft fire is that the heat level in the immediate vicinity can soon raise to the point that firemen and fire fighting equipment cannot be close to the aircraft. It is a further objective of my invention to provide apparatus whereby personnel and equipment will be exposed to high heat levels for the least possible time.

Additional objectives of my invention include: to devise means to fight aircraft fires minimizing the hazards to personnel in case of explosion; to provide means for separation of the hose and vehicle from the penetrating nozzle so that the vehicle can be promptly removed out of range of explosive forces when this action becomes necessary; to provide equipment adaptable for the various conditions that may be found in these fires; and to devise an efficient, economical and low maintenance apparatus insofar as these factors are consistent with the other objectives.

My invention will be best understood, together with additional objectives and advantages thereof, from a reading of the following description, read with reference to the drawings, in which:

Figure 1 shows the apparatus of my invention incorporated in a self-propelled, carbon dioxide tank truck. Certain portions of the boom assembly and the vehicle are well known to the art and only a brief description will be given thereof.

Figure 1:
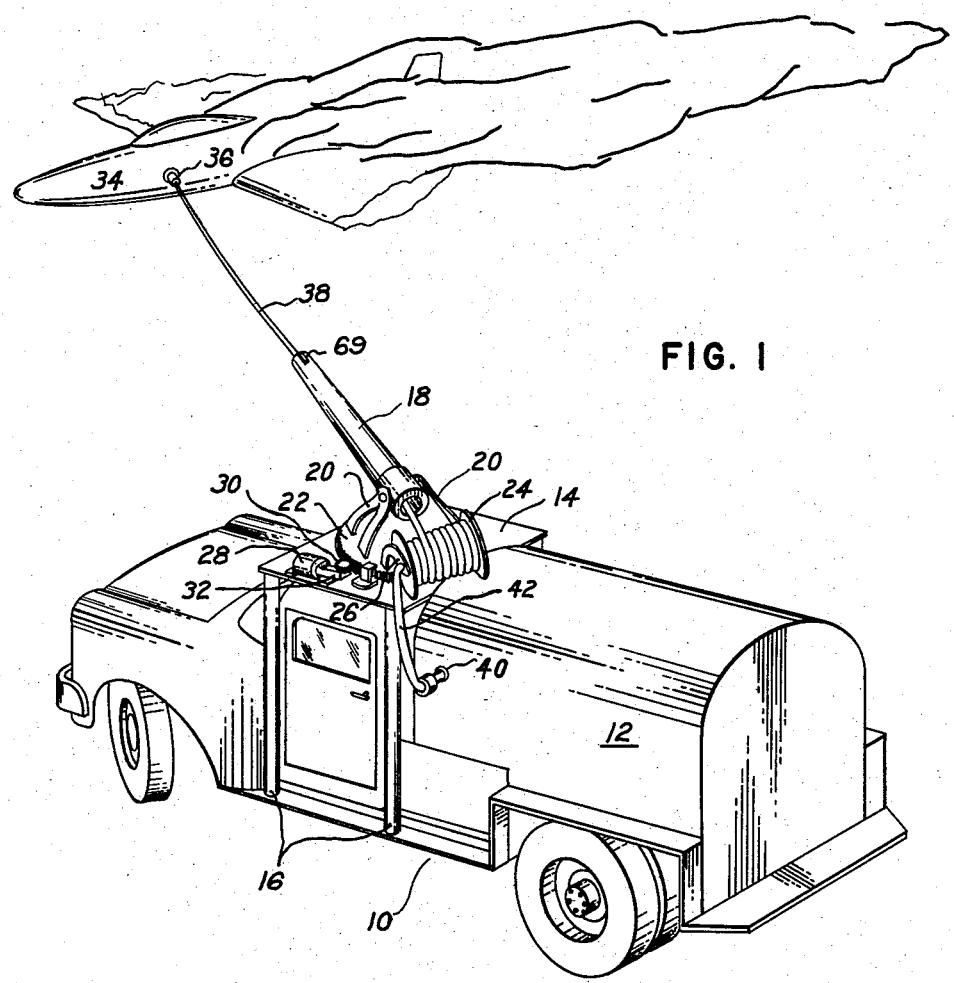
Figure 1 is a perspective view showing a specific embodiment of the apparatus of my invention installed on a vehicle and in operation fighting a fire in an aircraft.

The truck 10 has a carbon dioxide tank 12 mounted on the truck bed. A mounting platform 14 supported by legs 16 is provided to mount a boom assembly. A tubular boom 18 has trunnion mounts 20 which are supported by a ring plate gear 22. Plate 22 also supports a hose reel 24 by brackets 26. Motor 15 drives reel 24 through belt 17. Another motor 28 mounted on platform 14 has a drive gear 20 engaged with the gear teeth of plate 22. Drive gear 30 is supported by adjustable mounts 32. Plate 22 has a central support 21 and edge support of plate 22 is provided by roller type bearings 23 supported in brackets 25 mounted on platform 14. Upon rotation of plate 22, boom 18 is angularly adjusted.

Raising and lowering of boom 18 is accomplished by a hydraulic piston and cylinder 27 pivotally attached to boom 18 at pivot 29. The outer end of boom 18 supports a nozzle 36 adapted to penetrate the aircraft wall. The vehicle is run against aircraft 34 with the boom oriented by the means previously described so that nozzle 36 will strike a selected portion of the aircraft wall. The force for penetration is the momentum of the vehicle and it will be understood that the forces are ample for a minimum area penetrating point. After penetration and anchoring of nozzle 36 is achieved, truck 10 is backed away leaving the nozzle secured in the wall of airplane 34. Hose 38 attached to the nozzle is played out through tubular boom 18. Carbon dioxide is released through tank outlet 40 to supply hose 42 making connection with hose 38 within reel 24, thereby flooding the portion of the burning aircraft which is in communication with the compartment entered.

Figure 2:
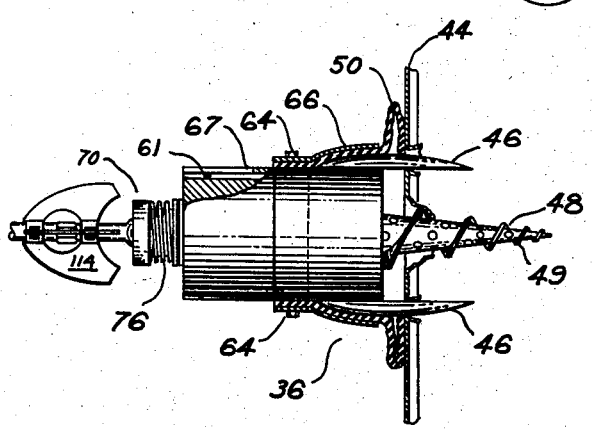
Figure 2 is an enlarged, fragmentary side view, partly in section, showing a penetrating nozzle anchored in the outer wall of an aircraft.

Figure 2 shows nozzle 36 penetrating an aircraft wall 44. Nozzle 36 has a rotatably supported penetrating point formed by an auger 48. Auger 48 should be formed of or pointed by a rugged material such as tool steel as the point thereof must achieve penetration under the force supplied by vehicle 10. Threads 49 on auger 48 rotate the auger as the wall 44 is penetrated. Primary anchoring means for the nozzle is the action of threads 49 against the jagged edges of the opening it has formed.

To prevent the auger coming out by reverse rotation, ratchet means are provided to prevent this action unless released. Auger 48 is attached to the outer end of a shaft 52 which is rotatably supported by radial bearings 54 and a thrust bearing 56 in a non-rotatable nozzle housing portion 62. Shaft 52 is limited in outward movement by a lock nut 58. Seals for this assembly have been omitted from the drawings for clarity of illustration and their application will be understood. The outer end of shaft 52 supports a ratchet ring 63. A spring pressed pawl 55 normally engages ratchet 63 to prevent reverse rotation except when manually released by pulling on the attached cord 60.

Housing 62 supports a pair of fixed knives 46 which also penetrate the aircraft wall as shown in Figure 2. This assists in securing housing 62 against rotation. A seal is effected around the area of penetration by a resilient cup 50 supported on housing 62 by a retaining piece 66 secured by bolts 64. Retaining piece 66 has blowout plugs 68, of conventional type, to prevent extreme pressure build up inside the burning aircraft 34.

Housing 62 is mounted on boom 18 in a manner assisting in the prevention of rotation during penetration. An annular, rearwardly open groove 61 receives the tubular wall of boom 18. A section 67 of the outer wall forming groove 61 is recessed and a plate 69 for boom 18 fits recess 67 to prevent rotation. The boom 18 is slidably received in groove 61 so that detachment may be achieved merely by backing up vehicle 10.

Nozzle 36 has a quick disconnect 70 with hose 38. Tension disconnect housing 74 is threadably engaged in counterbore 59 of housing 62 and secured by a lock nut 72. A compression spring 76 on disconnect housing 74 acts between a lock nut 78 and a ring retainer 80. A ball member 86 is received in a socket 85 in housing 74. An O-ring seal between ball member 86 and socket 85 is shown at 87. Fluid connection is achieved through the nozzle by an axial passageway 94 in ball member 86 to a connecting chamber 96, past a check valve 98, through a check valve chamber 100, through ports 106 to a central passageway 105 in shaft 52 which communicates with ports 103 in auger 48. Ball check 98 is spring pressed by a compression spring 102 supported by an adjustable screw member 104.

Ball 86 is normally retained against escape by an abutment ring 84. Ring 84 has an outstanding annular abutment 90. Abutment 90 forms lock means to engage a series of pivotal cam members 82. Ten or more cam members may be provided set in parallel slots extending transversely of a pair of annular abutments 91, 93 which retain a keeper ring 95 on which cam members 82 are pivoted. Recesses 81 of cam members 82 normally hold abutment 90 of ring 84 in place.

The strength of compression spring 76 and the design and proportioning of dimensions of the various cam surfaces would be such that upon force of a selected value being applied to ball 86, abutment 90 acts to pivot cam members 82 outwardly. A small space 89 between cams 82 and the edge of ring 80 permits sufficient outward movement that the inner cam ends 101 can act against the adjacent wall of retaining ring 80 to permit further pivoting of cams 82 to the point that abutment 90 is released from recesses 81 and ball 86 is separated from the nozzle with ring 84. It will be noted that abutment 90 and recesses 81 have abutting sloping walls which act to pivot cam members 82 outwardly during this action. The tension to cause this disconnect is the force of the vehicle. This would be done particularly when an explosion was imminent so that the vehicle was no longer safe in the position shown in Figure 1.

Figure 3:
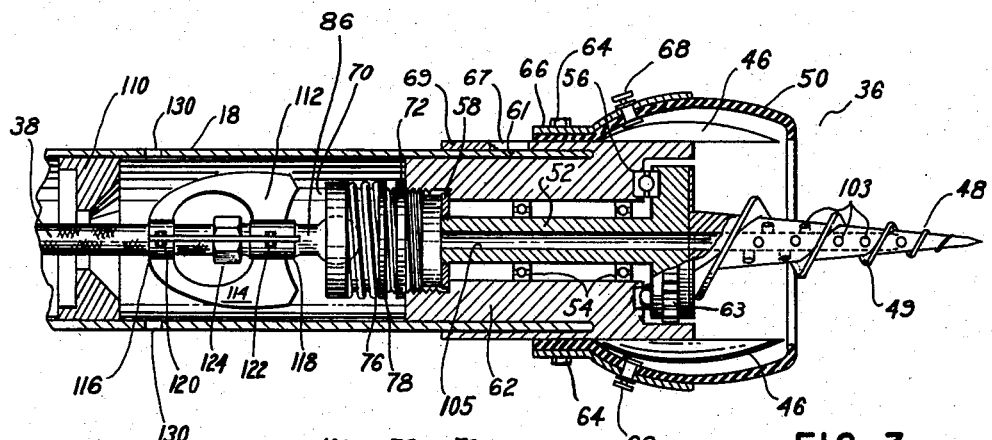
Figure 3 is a view similar in part to Figure 2 but on larger scale and being principally in section.
Figures 4, 6:
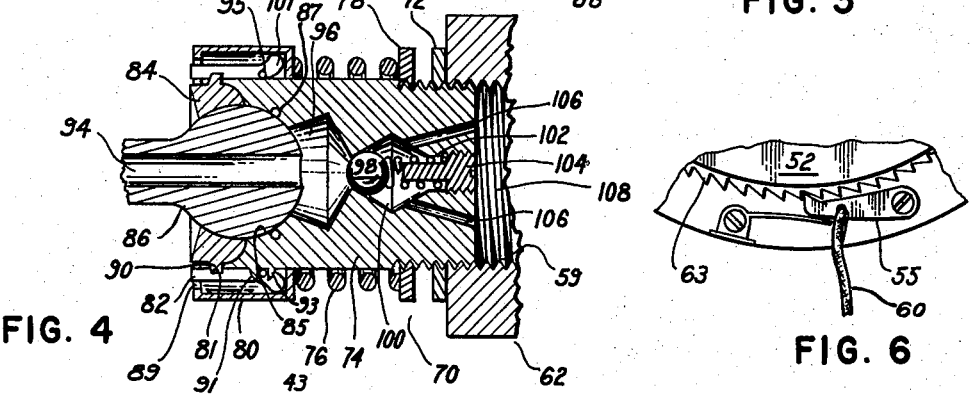
Figure 4 is an enlarged view, principally in section, of portions of a quick disconnect connection between the nozzle and a hose attachment.
Figure 6 is an enlarged fragmentary view of ratchet means on the nozzle.
Figure 5:
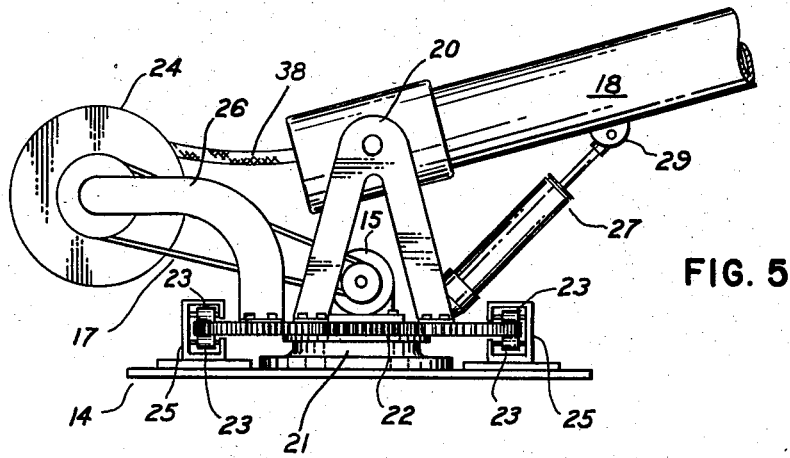
Figure 5 is an enlarged side elevation of portions of the assembly for directing movement of the boom.

To re-engage ball 86, retaining ring 80 is moved against compression spring 76 to the point that the lip of the ring acts against cam ends 101 and cams 82 are opened sufficiently to receive ring 84 and annular abutment 90. To prevent hose 38 from going completely through boom 18 when disconnected, an abutment 110 is provided in boom 18 which acts against hose clamp 112. Hose 38 is clamped to ball member 86 in the manner indicated in Figure 3 in which a series of plates 114 support a pair of spaced bearings 116, 118. Bolts 120, 122 are tightened respectively around hose 38 and ball fixture 86. A screw and nut type connection 124 is made between hose 38 and ball fixture 86 intermediate clamp bearings 116, 118.

When the boom and hose are disconnected from nozzle 36, fire extinguishing fluid may be directed on a fire using ball fixture 86 as the nozzle. Openings 130 in boom 18 are provided for air ingress in such action and the air supplemented carbon dioxide stream may be directed for considerable distances.

The operation of the device is semi-automatic, as previously indicated. Nozzle 36 is rammed into the aircraft by action of the vehicle and is anchored by the action of auger 48. The vehicle is then backed away and fire extinguishing fluid is fed through hose 38. In an emergency, the hose can be separated from the nozzle by further backward movement and the remaining apparatus is usable for further fire fighting.

Having thus specifically described my invention, I do not wish to be understood as limiting myself to the precise details of construction shown, but instead wish to cover those modifications thereof which will occur to those skilled in the art from my disclosure and which fairly fall within the scope of my invention, as described in the following claims.

I claim:

1. Apparatus for fighting aircraft fires by achieving access through a metal aircraft wall, comprising: a self-propelled vehicle, a nozzle and support means on the vehicle rigidly supporting the nozzle in an exposed position so that the nozzle may be rammed into said aircraft wall by movement of the vehicle, said nozzle having a penetrating point operable by such ramming to break and penetrate the aircraft wall under the force of the vehicle movement and having a fluid discharge passageway and terminal ports in said point to direct fluid into the area of penetration of said aircraft wall, a source of fire extinguishing fluid on said vehicle and a hose connecting said fluid discharge passageway to said source, at least a portion of said nozzle including said point being detachable from said support means and said hose being extendible whereby after the nozzle has penetrated the aircraft wall the vehicle may be backed away, said nozzle portion being detached from the support means and the hose being played out while fluid connection is maintained, so that fire extinguishing fluid may be fed to the fire while the vehicle is located a sufficient distance away to avoid excessive heat.

2. The subject matter of claim 1 in which said penetrating point on said nozzle is a rotatably supported, tapered and pointed auger, the auger having outstanding threads to anchor the same in the airplane wall.

3. The subject matter of claim 2 in which said nozzle has a non-rotatable portion, a blade attached to said non-rotatable portion to penetrate the aircraft wall to hold the portion against rotation, ratchet means between said auger and said non-rotatable portion normally preventing rotation of said auger in a disengaging direction.

4. The subject matter of claim 1 in which said nozzle has a resilient cup surrounding the point to press against the aircraft wall and to envelop the area of penetration.

5. The subject matter of claim 1 in which said support means is a tubular boom and manually controllable means for supporting and adjusting the direction of the boom, said nozzle having a rearwardly open annular groove in which said tubular boom is slidably received whereby the nozzle is automatically disconnected when the vehicle is backed away while the point is engaged in the aircraft wall, the hose extending through said boom.

6. The subject matter of claim 5 in which said nozzle has a releasable connection with said hose whereby said nozzle is separable from said hose when sufficient pull is made on the connection by the vehicle, said boom having stop means therein limiting movement of said hose after separation whereby the end of said hose separated from said nozzle forms nozzle means inside the end of said boom, and said boom having air supply openings near said end of said hose to supply air to the stream of fire extinguishing fluid when the boom is used without said nozzle for fire fighting.

7. The subject matter of claim 1 in which said nozzle and point have anchoring means automatically securing the point in the aircraft wall after penetration and holding the nozzle in place as the vehicle is backed away and the hose played out and said nozzle having a releasable connection with said hose whereby said nozzle is separable from said hose when sufficient pull is made on the connection by the vehicle whereby the vehicle may be released from connection with the aircraft when need arises such as immediate likelihood of explosion or other reason to abandon the aircraft.

8. Apparatus for fighting aircraft fires by achieving access through a metal aircraft wall, comprising: a self-propelled vehicle, a nozzle and support means on the vehicle rigidly supporting the nozzle in an exposed position so that the nozzle may be rammed into said aircraft wall by movement of the vehicle, said nozzle having a penetrating point, operable by such ramming to break and penetrate the aircraft wall under the force of the vehicle movement and having a fluid discharge passageway to direct fluid into the area of penetration of said aircraft wall, said nozzle having anchoring means automatically securing the nozzle to the aircraft wall upon said penetration, a source of fire extinguishing fluid on said vehicle and a hose connecting said fluid discharge passageway to said source, at least a portion of said nozzle including said point and anchoring means being detachable from said support means and said hose being extendible whereby after the nozzle has penetrated the aircraft wall the vehicle may be backed away with the nozzle detached from the support means and anchored to the aircraft wall and the hose played out while fluid communication is maintained, so that fire extinguishing fluid may be fed to the fire while the vehicle is located away from the aircraft.

References Cited in the file of this patent

UNITED STATES PATENTS

| | | |
|---|---|---|
| 477,875 | Vickers | June 28, 1892 |
| 551,527 | Cunningham | Dec. 17, 1895 |
| 1,640,417 | Marks | Aug. 30, 1927 |
| 1,644,290 | Titcomb et al. | Oct. 4, 1927 |
| 2,413,083 | Snowden et al. | Dec. 24, 1946 |
| 2,577,457 | Freeman | Dec. 4, 1951 |